US008112003B2

(12) United States Patent
Kozato

(10) Patent No.: US 8,112,003 B2
(45) Date of Patent: Feb. 7, 2012

(54) OPTICAL TRANSMITTER, OPERATION CONTROLLING METHOD FOR THE SAME, AND RECORDING MEDIUM

(75) Inventor: Atsushi Kozato, Tokyo (JP)

(73) Assignee: NEC Corporation, Tokyo (JP)

( * ) Notice: Subject to any disclaimer, the term of this patent is extended or adjusted under 35 U.S.C. 154(b) by 714 days.

(21) Appl. No.: 11/780,161

(22) Filed: Jul. 19, 2007

(65) Prior Publication Data

US 2008/0056728 A1 Mar. 6, 2008

(30) Foreign Application Priority Data

Aug. 30, 2006 (JP) ................................ 2006-232917

(51) Int. Cl.
*H04B 10/04* (2006.01)

(52) U.S. Cl. ....................................... 398/198; 398/197

(58) Field of Classification Search .................... 398/33, 398/81, 93–95, 158, 159, 162, 195–198; 498/197–198
See application file for complete search history.

(56) References Cited

U.S. PATENT DOCUMENTS 6,222,861 B1 4/2001 Kuo et al.
6,590,686 B1 7/2003 Sekiya et al.
6,842,587 B1 * 1/2005 McGhan et al. .............. 398/201
2005/0058460 A1 3/2005 Wang
2006/0098699 A1 * 5/2006 Sanchez .......................... 372/26

FOREIGN PATENT DOCUMENTS

JP 2002-049014 A 2/2002
JP 2003-134052 A 5/2003
JP 2005-208172 A 8/2005
JP 2006-121368 A 5/2006

OTHER PUBLICATIONS

Japanese Patent Office Action dated Feb. 1, 2011 and partial English-language translation thereof.
Communication dated Dec. 6, 2011 from the Japanese Patent Office in counterpart Japanese application No. 2006232917.

* cited by examiner

*Primary Examiner* — Leslie Pascal
(74) *Attorney, Agent, or Firm* — Sughrue Mion, PLLC

(57) ABSTRACT

An optical transmitter according to an exemplary aspect of the present invention is an optical transmitter that includes a variable-wavelength light source and a modulator for modulating and outputting the output light of the variable-wavelength light source in accordance with data to be transmitted, wherein the optical transmitter includes a control unit for varying the bias voltage of the modulator based on the light output power of the modulator to make feedback control of the light output power of the modulator during switching of the output wavelength of the variable-wavelength light source.

8 Claims, 2 Drawing Sheets

DATA FOR TRANSMISSION
MODULATOR DRIVING UNIT 3
CW - LD UNIT 1
MODULATOR 2
CW - LD CONTROL UNIT 41
MODULATOR CONTROL UNIT 42
CONTROL UNIT 4
ROM 5

OPTICAL TRANSMITTER, OPERATION CONTROLLING METHOD FOR THE SAME, AND RECORDING MEDIUM

INCORPORATION BY REFERENCE

This application is based upon and claims the benefit of priority from Japanese patent application No. 2006-232917, filed on Aug. 30, 2006, the disclosure of which is incorporated herein in its entirety by reference.

BACKGROUND OF THE INVENTION

1. Field of the Invention

The present invention relates to an optical transmitter, an operation controlling method for the same, and a recording medium, and more particularly, to a method for adjusting light output power during switching of the wavelength of a variable-wavelength light source having variable output wavelength.

2. Description of the Related Art

FIG. 3 shows the configuration of an optical transmitter of a related art. In FIG. 3, the optical transmitter includes a Continuous Wave-Laser Diode (CW-LD) unit 1 as a variable-wavelength light source, a modulator 2, a modulator driving unit 3, and a control unit 6.

The modulator driving unit 3 drives the modulator 2 in accordance with data to be transmitted, and the modulator 2 modulates light output from the CW-LD unit 1 and outputs the modulated output as an optical transmission signal. At normal times, a CW-LD control unit 61 of the control unit 6 controls the CW-LD unit 1 so that the light output power and output wavelength of the CW-LD unit 1 are optimized. At normal times, a modulator control unit 62 of the control unit 6 controls the modulator 2 so that the waveform of output light from the modulator 2 is optimized.

When the output wavelength of the CW-LD unit 1 is switched (varied), the CW-LD control unit 61 switches the output wavelength by varying the device temperature and LD bias current of the CW-LD unit 1 to make feedback control, while monitoring the light output power and output wavelength from back light output of the CW-LD unit 1 so that light output power characteristics do not degrade during wavelength switching for maintenance of transmission characteristics.

During switching of wavelength, the modulator control unit 62 controls the bias voltage of the modulator 2 to optimize the output waveform while monitoring the output light from the modulator 2 as at normal times. Wavelength switching of the CW-LD unit 1 is conducted when there is no data to transmit.

In switching of the output wavelength of the CW-LD unit 1, if priority is given to the speed of wavelength switching, light output power characteristics will degrade. However, when it is necessary for the CW-LD control unit 61 to make feedback control for wavelength switching so that light output power characteristics do not degrade as mentioned above, there will be problems of limitation on the time for wavelength switching due to conditions of time constants or the like for the feedback control and decrease in the speed of wavelength switching.

Japanese Patent Laid-Open No. 2002-049014 describes an optical transmitter that includes a light emitting device and an optical modulator, wherein the characteristics of the optical modulator are stored in ROM, and the driving current source of the light emitting device is controlled based on the information stored in the ROM to keep output of modulated light constant. However, Japanese Patent Laid-Open No. 2002-049014 includes no description on operations during wavelength switching.

BRIEF SUMMARY OF THE INVENTION

An exemplary object of the present invention is to provide an optical transmitter that can shorten wavelength switching time while preventing the degradation of light output power characteristics, an operation controlling method for the same, and a recording medium.

An optical transmitter according to an exemplary aspect of the present invention is an optical transmitter that includes a variable-wavelength light source and a modulator for modulating and outputting the output light of the variable-wavelength light source in accordance with data to be transmitted, wherein the optical transmitter includes a control unit for varying the bias voltage of the modulator based on the light output power of the modulator to make feedback control of the light output power of the modulator during switching of the output wavelength of the variable-wavelength light source.

An operation controlling method according to an exemplary aspect of the present invention is an operation controlling method for an optical transmitter that includes a variable-wavelength light source and a modulator for modulating and outputting the output light of the variable-wavelength light source in accordance with data to be transmitted, the method including: varying the bias voltage of the modulator based on the light output power of the modulator to make feedback control of the light output power of the modulator during switching of the output wavelength of the variable-wavelength light source.

A recording medium according to an exemplary aspect of the present invention is a recording medium having recorded thereon a program for causing a computer to execute an operation controlling method for an optical transmitter that includes a variable-wavelength light source and a modulator for modulating and outputting the output light of the variable-wavelength light source in accordance with data to be transmitted, the program including processing of varying the bias voltage of the modulator based on the light output power of the modulator to make feedback control of the light output power of the modulator during switching of the output wavelength of the variable-wavelength light source.

An optical transmitter according to an exemplary aspect of the present invention is an optical transmitter that includes a variable-wavelength light source and a modulator for modulating and outputting the output light of the variable-wavelength light source in accordance with data to be transmitted, wherein the optical transmitter includes control means for varying the bias voltage of the modulator based on the light output power of the modulator to make feedback control of the light output power of the modulator during switching of the output wavelength of the variable-wavelength light source.

DETAILED DESCRIPTION OF EXEMPLARY EMBODIMENTS

An exemplary embodiment of the invention will be described with reference to drawings.

Figure 1:
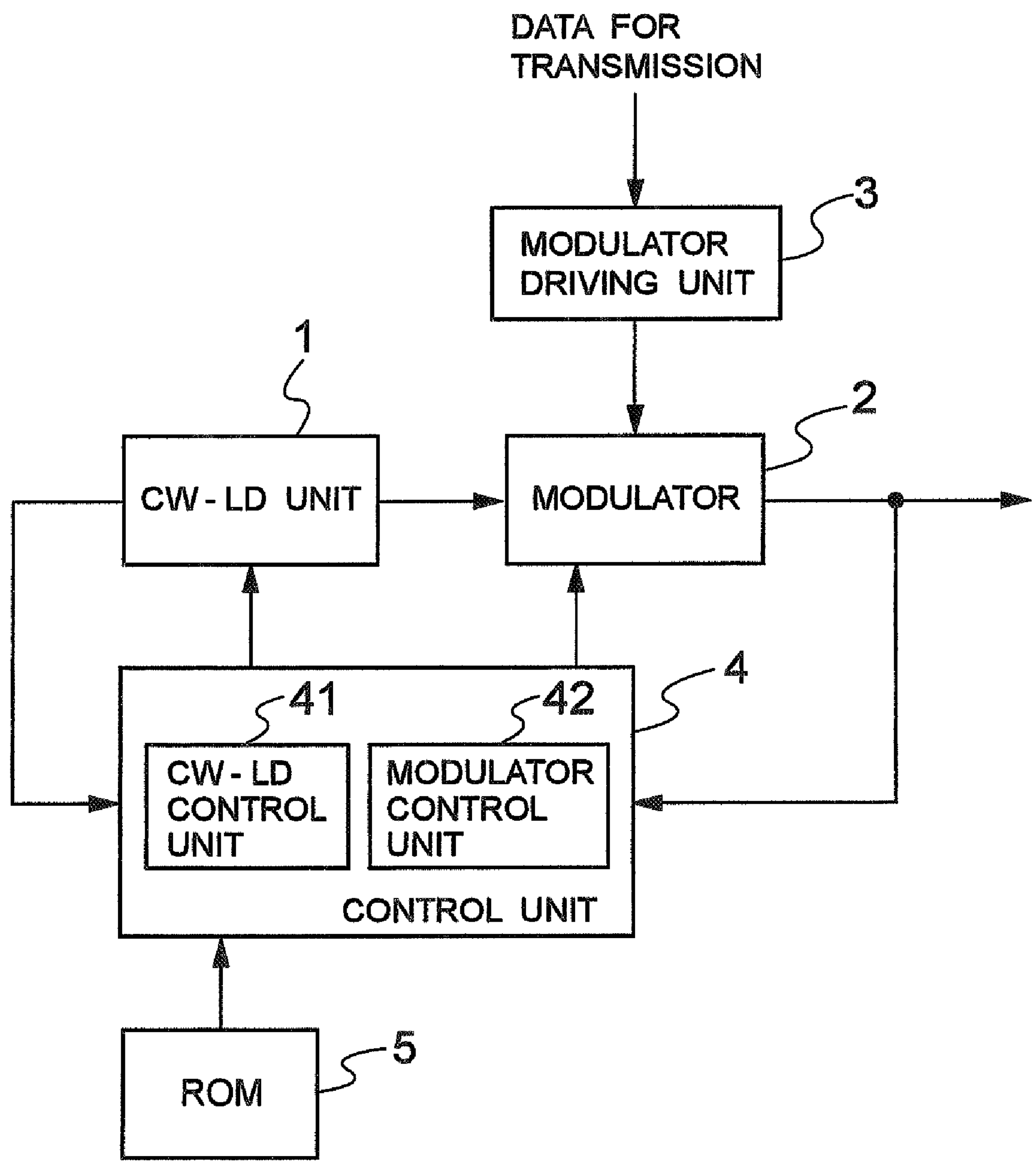
FIG. 1 shows the configuration of an optical transmitter according to an exemplary embodiment of the invention.
Figure 3:
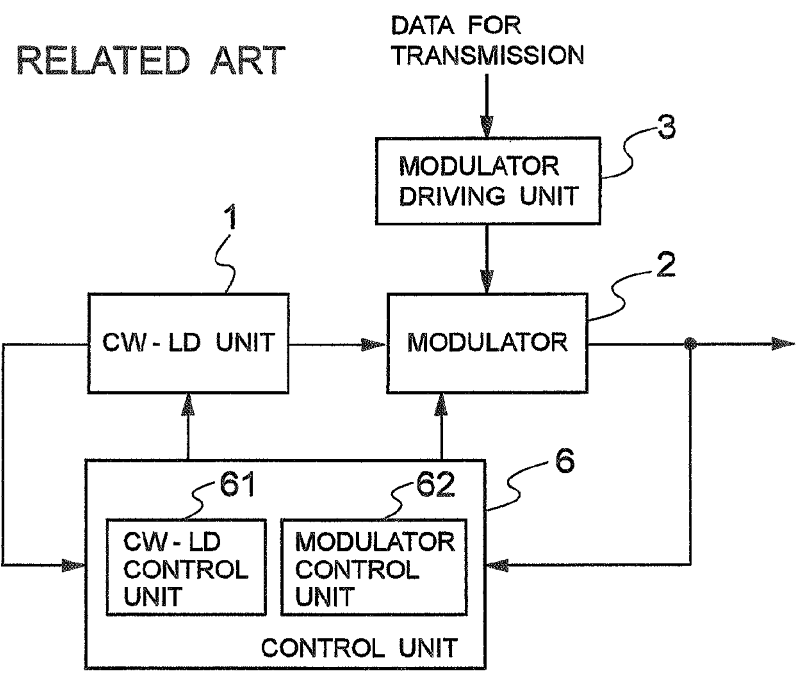
FIG. 3 shows the configuration of an optical transmitter of a related art.

FIG. 1 shows a configuration of an optical transmitter according to an exemplary embodiment of the invention, where components corresponding to the ones in FIG. 3 are denoted with the same reference numerals. In FIG. 1, the relationship between the light output power of a modulator 2 and time is stored in ROM 5 as a desired characteristic. At normal times, a CW-LD control unit 41 of a control unit 4 controls a CW-LD unit 1 so that the light output power and output wavelength of the CW-LD unit 1 are optimized. At normal times, a modulator control unit 42 of the control unit 4 controls the modulator 2 so that the waveform of output light from the modulator 2 is optimized.

When switching (varying) the output wavelength of the CW-LD unit 1, the CW-LD control unit 41 switches the output wavelength by varying the device temperature and LD bias current of the CW-LD unit 1 to make feedback control while monitoring the light output power and output wavelength from the back light output of the CW-LD unit 1. Here, the CW-LD control unit 41 gives higher priority to control of wavelength switching than to control of light output power tolerating the degradation of light output power characteristics during wavelength switching (i.e., provides control optimized for wavelength switching). Specifically, during wavelength switching, the CW-LD control unit 41 preferentially varies the device temperature of the CW-LD unit 1, which is a key parameter for wavelength switching, and coarsely varies the LD bias current, which is a key parameter for varying the light output power of the CW-LD unit 1, thereby seeking to shorten the wavelength switching time.

During switching of wavelength, the modulator control unit 42 varies the bias voltage of the modulator 2 to make feedback control of the light output power of the modulator 2 while monitoring the light output power of the modulator 2 so that the light output power characteristics do not degrade. Specifically, during switching of wavelength, the modulator control unit 42 compares the light output power of the modulator 2 with the desired light output power characteristic (the time-to-light-output-power characteristic) stored in the ROM 5, and variably controls the bias voltage of the modulator 2 so as to maintain the desired light output power characteristic during the wavelength switching. Although the output waveform of the modulator 2 is not optimized because the modulator control unit 42 seeks to optimize the light output power during wavelength switching as mentioned above, it poses no problem as switching of wavelength is performed when there is no data to transmit.

Figure 2:
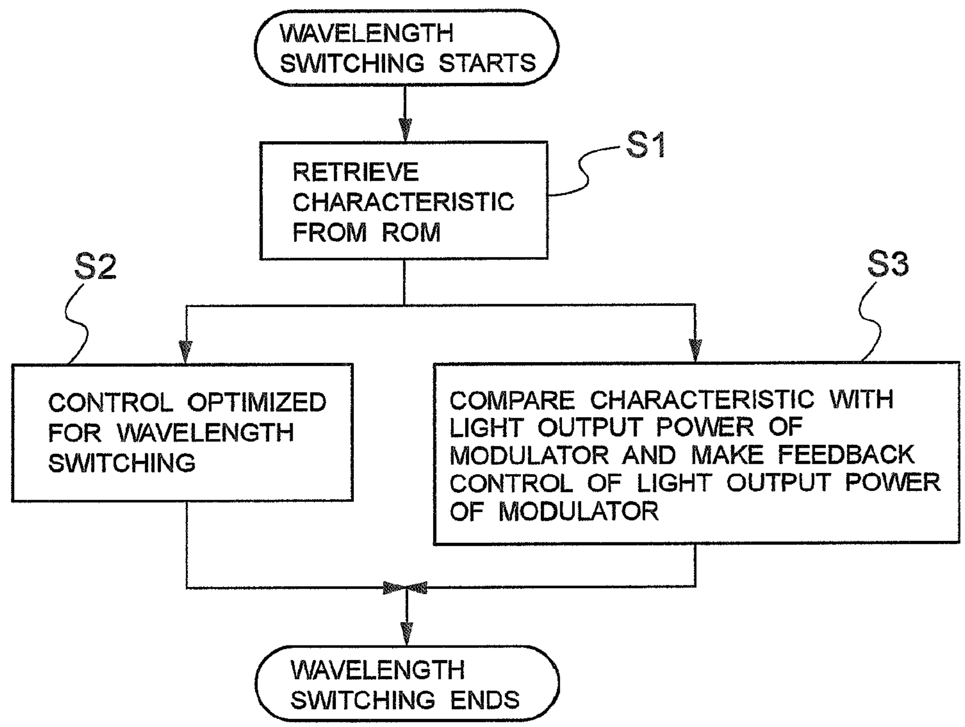
FIG. 2 is a flowchart illustrating the operation of the optical transmitter of FIG. 1.

The operation of the optical transmitter according to the exemplary embodiment of the invention will now be described with reference to drawings. FIG. 2 is a flowchart illustrating the operation of the optical transmitter shown in FIG. 1. In FIG. 2, when the output wavelength of the CW-LD unit 1 is to be switched, the control unit 4 reads the desired light output power characteristic stored in the ROM 5 (step S1).

Then, the CW-LD control unit 41 provides control optimized for wavelength switching as described above (step S2). Also, during the control of wavelength switching by the CW-LD control unit 41, the modulator control unit 42 compares the light output power of the modulator 2 with the desired light output power characteristic, and makes feedback control of the light output power of the modulator 2 as mentioned above (step S3).

More specifically, the modulator control unit 42 compares the light output power of the modulator 2 with a light output power corresponding to the current point in time in the desired light output power characteristic. If the former is smaller than the latter, the modulator control unit 42 increases the bias voltage of the modulator 2 by a predetermined value, and if the former is greater than the latter, it decreases the bias voltage of the modulator 2 by a predetermined value. By repeating such control during switching of wavelength, it is possible to prevent degradation of light output power characteristics of the optical transmitter during the wavelength switching.

As has been thus described, in the exemplary embodiment of the invention, since light output power is adjusted by the modulator control unit 42 controlling the modulator 2 during wavelength switching of the CW-LD unit 1, the CW-LD control unit 41 can control the CW-LD unit 1 giving the highest priority to wavelength switching time and lowered priority to optimization of light output power, which can hence shorten the wavelength switching time while preventing the degradation of light output power characteristics.

In the exemplary embodiment of the invention, the speed of feedback control for the light output power of the modulator 2 performed by the modulator control unit 42 may be varied in accordance with the difference between the light output power of the modulator 2 and the light input power thereof. That is, when the difference between the light output power and the light input power of the modulator 2 is equal to or greater than a predetermined threshold value, the modulator control unit 42 may increase the predetermined value mentioned above by which the bias voltage of the modulator 2 is increased or decreased (or the amount of increment/decrement), and when the difference is smaller than the threshold value, it may decrease the predetermined value (or the amount of increment/decrement) at step S3 of FIG. 2, for example.

In the ROM 5, a desired light output power characteristic (a time-to-light-output-power characteristic) may be stored for each wavelength. In this case, the control unit 4 may read a light output power characteristic corresponding to the target wavelength of switching from the ROM 5 at step S1 of FIG. 2 and use it for feedback control of light output power.

The processing operation of the optical transmitter according to the flowchart shown in FIG. 2 can be realized by a program prestored in a storage medium, such as ROM, being read and executed by a computer serving as a CPU (control unit) in the optical transmitter.

An exemplary advantage according to the invention is that, since the control unit controls the modulator to adjust light output power during switching of wavelength, it is possible to provide control optimized for wavelength switching for the variable-wavelength light source, which results in the exemplary effect of shortening the wavelength switching time while preventing the degradation of light output power characteristics.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical transmitter that comprises a variable-wavelength light source and a modulator for modulating and outputting the output light of the variable-wavelength light source in accordance with data to be transmitted, wherein the optical transmitter comprises a control unit for varying the bias voltage of the modulator based on the light output power of the modulator to make feedback control of the light output power of the modulator between a first time when a device temperature and a laser diode bias current of the variable-wavelength light source start to be varied in order to switch the output wavelength of the variable-wavelength light source, and a second time when switching of the output wavelength of the variable-wavelength is completed, and wherein the control unit compares the light output power of the modulator with a desired time-to-light-output-power characteristic and variably controls the bias voltage of the modulator.

2. The optical transmitter according to claim 1, wherein the control unit variably controls the amount of increment/decrement for variably controlling the bias voltage of the modulator in accordance with the difference between the light output power of the modulator and the light input power thereof.

3. The optical transmitter according to claim 1, further comprising a storage unit for storing the desired time-to-light-output-power characteristic.

4. The optical transmitter according to claim 3, wherein the storage unit stores therein the desired time-to-light-output-power characteristic for each wavelength.

5. An operation controlling method for an optical transmitter that comprises a variable-wavelength light source and a modulator for modulating and outputting the output light of the variable-wavelength light source in accordance with data to be transmitted, the method comprising: varying the bias voltage of the modulator based on the light output power of the modulator to make feedback control of the light output power of the modulator between a first time when a device temperature and a laser diode bias current of the variable-wavelength light source start to be varied in order to switch the output wavelength of the variable-wavelength light source, and a second time when switching of the output wavelength of the variable-wavelength is completed, wherein the light output power of the modulator is compared with a desired time-to-light-output-power characteristic to variably control the bias voltage of the modulator.

6. The operation controlling method according to claim 5, further comprising: variably controlling the amount of increment/decrement for variably controlling the bias voltage of the modulator in accordance with the difference between the light output power of the modulator and the light input power thereof.

7. A recording medium having recorded thereon a program for causing a computer to execute an operation controlling method for an optical transmitter that comprises a variable-wavelength light source and a modulator for modulating and outputting the output light of the variable-wavelength light source in accordance with data to be transmitted, the program comprising processing of varying the bias voltage of the modulator based on the light output power of the modulator to make feedback control of the light output power of the modulator between a first time when a device temperature and a laser diode bias current of the variable-wavelength light source start to be varied in order to switch the output wavelength of the variable-wavelength light source, and a second time when switching of the output wavelength of the variable-wavelength is completed, and comparing the light output power of the modulator with a desired time-to-light-output-power characteristic to variably control the bias voltage of the modulator.

8. An optical transmitter that comprises a variable-wavelength light source and a modulator for modulating and outputting the output light of the variable-wavelength light source in accordance with data to be transmitted, wherein the optical transmitter comprises control means for varying the bias voltage of the modulator based on the light output power of the modulator to make feedback control of the light output power of the modulator between a first time when a device temperature and a laser diode bias current of the variable-wavelength light source start to be varied in order to switch the output wavelength of the variable-wavelength light source, and a second time when switching of the output wavelength of the variable-wavelength is completed, and wherein the control means includes means for comparing the light output power of the modulator with a desired time-to-light-output-power characteristic and variably controls the bias voltage of the modulator.

* * * * *